United States Patent
Andersson et al.

(10) Patent No.: US 7,341,682 B2
(45) Date of Patent: Mar. 11, 2008

(54) MANUFACTURE OF POLYSACCHARIDE BEADS

(75) Inventors: Ralf Göran Andersson, Helsingborg (SE); Hans Berg, Uppsala (SE); Ingemar Jonsson, Helsingborg (SE); Anders Larsson, Uppsala (SE)

(73) Assignee: GE Healthcare Bio-Sciences AB, Uppsala (SE)

( * ) Notice: Subject to any disclaimer, the term of this patent is extended or adjusted under 35 U.S.C. 154(b) by 540 days.

(21) Appl. No.: 10/512,301

(22) PCT Filed: Apr. 17, 2003

(86) PCT No.: PCT/SE03/00629

§ 371 (c)(1),
(2), (4) Date: Oct. 21, 2004

(87) PCT Pub. No.: WO03/091315

PCT Pub. Date: Nov. 6, 2003

(65) Prior Publication Data

US 2005/0179151 A1    Aug. 18, 2005

(30) Foreign Application Priority Data

Apr. 25, 2002    (SE)    .................................... 0201289

(51) Int. Cl.
*B29B 9/00*    (2006.01)

(52) U.S. Cl. .............................................. 264/8; 264/5

(58) Field of Classification Search .................... 264/5, 264/8, 13
See application file for complete search history.

(56) References Cited

U.S. PATENT DOCUMENTS

| 4,242,298 A | * | 12/1980 | Gurske ....................... 264/233 |
| 5,662,840 A | | 9/1997 | Thomas et al. |
| 5,718,969 A | | 2/1998 | Sewall et al. |
| 6,248,268 B1 | | 6/2001 | Cook |
| 6,565,885 B1 | * | 5/2003 | Tarara et al. ................ 424/489 |

FOREIGN PATENT DOCUMENTS

| GB | 887901 | 1/1962 |
| WO | WO 02/12374 | 2/2002 |

* cited by examiner

*Primary Examiner*—Allan R. Kuhns
(74) *Attorney, Agent, or Firm*—Yonggang Ji

(57) ABSTRACT

The present invention is a process of manufacture of one or more polysaccharide beads, comprising generating an aerosol of an aqueous polysaccharide solution, cooling the droplets of said aerosol in air to initiate gelling thereof and collecting droplets as gelled beads in a liquid or on a surface, characterised by adding a hydrophilic vapour pressure-lowering agent to said polysaccharide solution.

10 Claims, 1 Drawing Sheet

MANUFACTURE OF POLYSACCHARIDE BEADS

CROSS REFERENCE TO RELATED APPLICATIONS

This application is a filing under 35 U.S.C. 371 and claims priority to international patent application Ser. No. PCT/SE03/00629 filed Apr. 17, 2003, published on Nov. 6, 2003 as WO 03/091315 and also claims priority to patent application Ser. No. 0201289-6 filed in Sweden on Apr. 25, 2002; the disclosures of which are incorporated herein by reference in their entireties.

TECHNICAL FIELD

The present invention relates to the manufacture of microspheres, and more specifically to the manufacture of porous polysaccharide beads. The invention also relates to porous polysaccharide beads as such.

BACKGROUND

Porous microspheres have found use for many purposes, such as support for growth of micro-organisms and as carriers in separation techniques. Gelled microspheres have been shown to exhibit especially advantageous properties in chromatographic separations, for example as concerns mass transport, and are therefore one of the most widely used carrier materials at present.

Conventionally, polysaccharide beads have been produced by inverse suspension techniques. In brief, such methods use a heated aqueous solution, which includes a thermally gelling polysaccharide. Said solution is mixed into a heated organic solvent, such as toluene. The aqueous solution and the solvent form an emulsion, which is then cooled to allow the aqueous phase of the emulsion to gel into the form of microspheres. However, the hazardous nature of the solvents normally used renders them undesired to handle, since in general they are often neurotoxic and also highly flammable. In addition, extensive washing procedures are required to remove the solvent before use of the particles e.g. in chromatography. Furthermore, inverse suspension techniques usually result in particle populations of relatively broad size distributions. Since many practical applications require particles of a similar or almost identical size, an additional step e.g. by sieving is then required after the inverse suspension step. Accordingly, these techniques are also time-consuming and consequently costly procedures.

To avoid the above-described disadvantages, polysaccharide beads have more recently been manufactured in methods wherein beads are formed and gelled in air rather than in a solvent. For example, U.S. Pat. No. 6,248,268 (FMC Corporation) describes how polymer microparticles suitable for gel chromatography are formed by spraying a composition of a thermally-gelling polymer in an aqueous medium into ambient air and allowing the atomised composition to gel in the air. If a rehydrateable microgel is desired, then a non-gelling hydrocolloid is added. Such hydrocolloids are exemplified by a number of various polymers, for example various polysaccharides and some synthetic polymers.

However, a drawback with beads so produced is that the water evaporation from the droplets will result in a skin on the bead surface with lower pore size than the bulk of the bead. The skin will restrict the mass transport properties of the bead and often needs to be compensated by use of a lower agarose concentration in the bead-forming solution. However, such a low agarose concentration will in turn result in poor mechanical properties of the beads.

The formation of skin in the field of polymer microparticles has been discussed in U.S. Pat. No. 6,248,268 (XC Corporation). However, the discussed skin is not a skin on the particle surface, instead U.S. Pat. No. 6,248,268 suggests how it can be avoided that the particles flatten out and form a skin on the surface of an aqueous medium used for collecting the microparticles. More specifically, it is disclosed how it is advantageous to avoid dehydration of the formed particles by allowing them to cool in water rather than in air. It is in this context it is suggested to add a surfactant to avoid that all sprayed particles are collected on the surface of said cooling water.

WO 02/12374 (Prometic Biosciences) discloses an apparatus that includes a rotating atomiser wheel onto which a uniform thin layer of a polymer is applied via a distributor. Due to the centrifugal force, the polymer will move to the periphery of the wheel and free flying particles are subsequently released. The apparatus further includes a catch tray to collect the porous polymer particles produced and an enclosure defining a partition between an interior environment and an exterior environment of the apparatus. Within the interior, the temperature and humidity are closely controlled so as to produce beads of narrow particle size distribution. However, even with this technology, the beads produced have been shown to exhibit the above-discussed undesired skin. Accordingly, controlling the humidity surrounding the beads is not a sufficient solution for solving the problem of a too rapid evaporation from polysaccharide beads as produced with spinning disk technology.

Thus, there is still a need in this field of new methods for producing polysaccharide beads with advantageous mass transport and mechanical properties to reasonable costs.

SUMMARY OF THE PRESENT INVENTION

One object of the present invention is to provide a process of manufacture of polysaccharide beads, which process results directly in a population of beads exhibiting a sufficiently narrow size distribution to avoid additional steps of sieving. Accordingly, the present process is a continuous and cost-efficient process. The polysaccharide beads manufactured according to the invention are useful e.g. in separation methods, either directly as in gel diffusion chromatography, hydrophobic interaction chromatography (HIC), or reverse phase chromatography (RPC), or, after suitable derivatisation, in affinity or ion exchange chromatography (IEX).

Another object of the present invention is to provide a process of manufacture of polysaccharide beads, which process avoids the problem of formation of skin on bead surface caused by undesired water evaporation.

A further object of the invention is to provide a process as described above, which results in beads that are advantageously used as chromatographic carriers due to improved mass transport properties and a good mechanical strength.

An additional object of the invention is to provide polysaccharide beads having one or more of the above discussed properties of a narrow size distribution, an eliminated or at least reduced surrounding skin and advantageous mechanical strength and mass transport properties. A specific object of the invention is to provide one or more such beads, which has also been derivatised with ion exchanging groups, which beads can be used in a conventional chromatographic separation without cracking due to the osmotic pressure induced by the fixed charges.

One or more of the above-described objects are achieved according to the invention as defined in the appended claims.

DEFINITIONS

Figure 1:
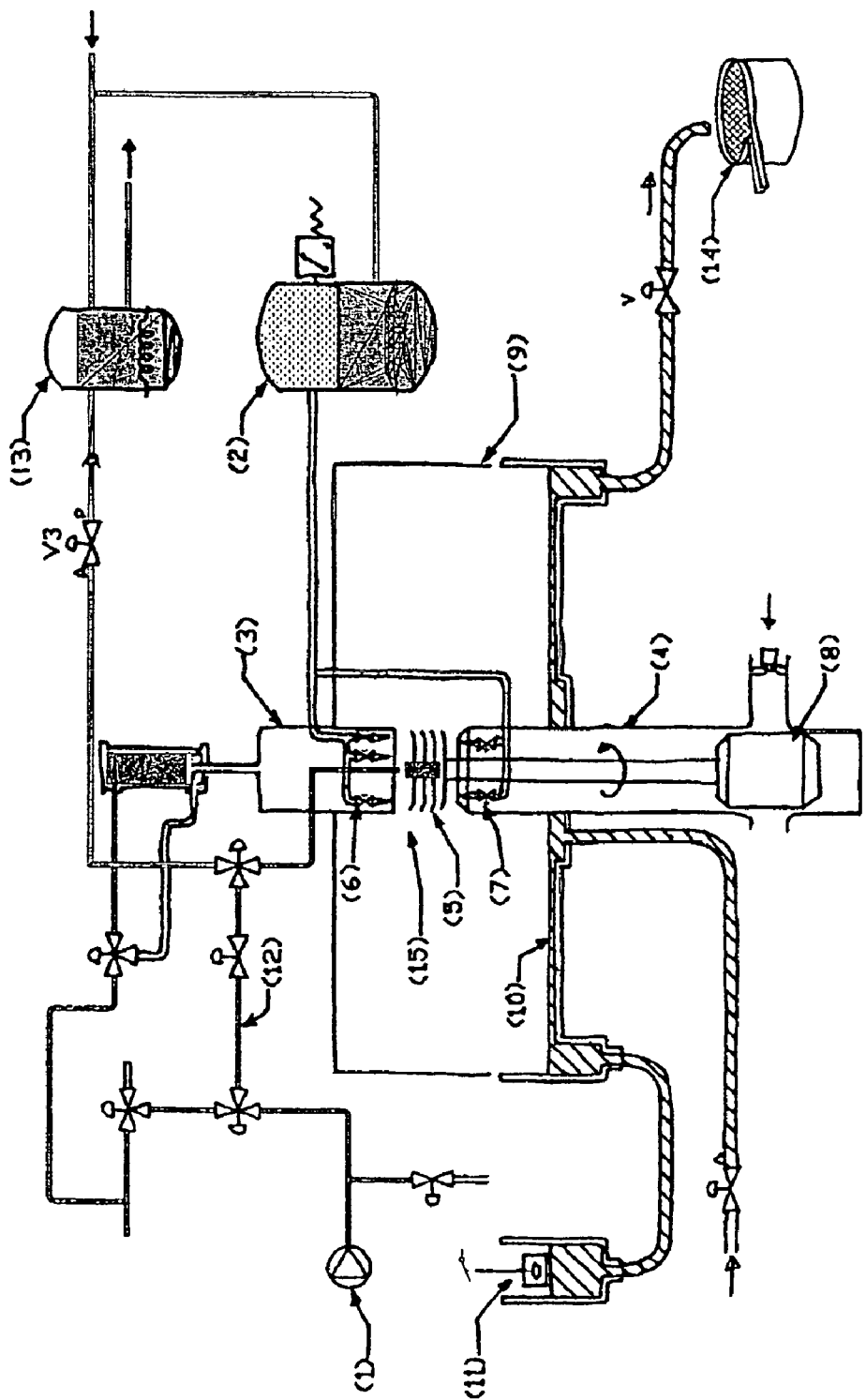
FIG. 1 shows an example of equipment suitable for manufacture of beads according to the present invention.

In the present specification, the term "bead" is used for essentially spherical microspheres, and refers to particles the diameter of which is in the region of up to about 500 μm.

The term "aerosol" refers to a multitude of droplets, individually surrounded by air or any other gas.

A "surfactant" is defined herein as a chemical compound, which drastically lower the surface tension of water even at a low concentration and which comprises one hydrophobic and one hydrophilic part.

DETAILED DESCRIPTION OF THE INVENTION

Thus, a first aspect of the invention is a process of manufacture of one or more polysaccharide beads, comprising generating an aerosol of an aqueous polysaccharide solution, cooling the droplets of said aerosol in air to initiate/allow gelling thereof and collecting droplets as gelled beads in a liquid or on a surface, characterised by adding a hydrophilic vapour pressure-lowering agent to said polysaccharide solution.

The solution of polysaccharide is an aqueous solution, which is conveniently obtained by adding polysaccharide to water, an aqueous salt solution or the like. However, excessive amounts of salt should be avoided, since it may impair the final pore structure of the bead. Mixing is preferably performed at an increased temperature, such as a few degrees below the boiling point of the solution, which will facilitate the dissolution. In general, the temperature of the water or aqueous solution should be kept low, such as below about 40° C., to avoid formation of lumps. Heating of the polysaccharide solution can be provided by any conventional means, such as by water bath, microwave oven etc.

As regards the vapour pressure-lowering agent, the requirement thereof is a capability to lower the vapour pressure of the polysaccharide solution. As the skilled person in this field will know, vapour pressure lowering is a colligative property and can depend on factors such as the mole fraction of the additive, size etc. For example, polymers are in general known to be poor vapour-pressure-lowering agents and are for that reason avoided according to the present invention. Accordingly, the hydrocolloids added according to the above-discussed U.S. Pat. No. 5,662,840 are all polymers and are, as the skilled person in this field easily realises, consequently too large to be capable of efficiently lowering the vapour pressure in an aqueous polysaccharide solution. Further, the present vapour pressure-lowering agent will also exhibit a boiling point, which is sufficiently high to essentially avoid or at least to substantially reduce evaporation from the surface of the gelling droplets. As mentioned above, the polysaccharide solution is aqueous and the nature of the vapour pressure-lowering agent should consequently be sufficiently hydrophilic to dissolve therein. As the skilled person in this field will realise, the vapour pressure-lowering agent should also be selected so that it does not have any negative impact on the gelling properties of the agarose.

Accordingly, in one embodiment of the present process, the vapour pressure-lowering agent comprises molecules of a Mw below about 200 D, preferably below about 190 D, more preferably below about 150 D and most preferably below about 80D, and is defined by a vapour pressure below that of water, such as below about 310 mbar, preferably below about 250 and most preferably below about 200 mbar at 70° C. Using another definition, in one embodiment the present process uses a vapour pressure-lowering agent that will result in a surface tension no lower than 50 mN/m at 10 wt % concentration in water at 25° C.

The reason for keeping the surface tension above said value is to avoid the formation of small satellite droplets that can give an undesirably wide bead size distribution. Hence, it is also important that any further additives do not lower the surface tension much further. It can even be advantageous if the surface tension is somewhat increased. However, in the present context, it is noted that measurements of surface tension in a complex solution such as the polysaccharide solution used herein can be complicated due to its viscous nature and the strong tendency for evaporative skin formation against air surfaces at elevated temperatures.

Alternatively, the nature of the vapour pressure-lowering agent is defined by a boiling point which is at least about 130, such as about 135, preferably at least about 150° C., such as about 153° C., and most preferably at least about 190° C., such as about 197° C.

Thus, the present invention shows for the first time that by adding a suitable amount of a vapour pressure-lowering agent to the polysaccharide solution, beads of an unexpected quality as concerns the size of surface pores and consequently mass transport can be obtained. Even though efforts have been made in the past to manufacture such beads from polysaccharide aerosols gelled in an atmosphere of increased humidity the beads so obtained have exhibited the above-discussed undesired skin that partly or fully occludes pores on the bead surface. Accordingly, it was quite unexpected to find that addition of a vapour pressure-lowering solvent could indeed reduce and even eliminate such skin formation.

In one embodiment, the vapour pressure-lowering agent is an organic substance. Thus, in a specific embodiment, the vapour pressure-lowering agent is selected from the group that consists of glycols, such as ethylene glycol, propylene glycol (i.e. propane-1,2-diol), propane-1,3-diol, butane-1,2-diol, butane-1,3-diol, butane-1,4-diol, butane-2,3-diol, diethylene glycol, dipropylene glycol and triethylene glycol; glycerols; such as glycerol, glyceryl ethers or glyceryl esters; polyols such as sorbitol, mannitol, glucose, sucrose, trimethylolpropane or pentaerythritol; amides, such as carbamide (urea), formamide, dimethylformamide, acetamide, dimethylacetamide or pyrrolidone; ethers; carboxylic acids; esters; alcohols; organosulfides; organosulfoxides, such as dimethylsulfoxide; sulfones, such as dimethyl sulfone; alcohol derivatives; glycol ethers; such as butyl carbitol or cellosolve; ether derivatives; amino alcohols; and ketones. In a specific embodiment, the vapour pressure-lowering agent is selected from the group that consists of glycols, such as ethylene glycol or propylene glycol; and glycerol. In an advantageous embodiment, the vapour pressure-lowering agent is ethylene glycol.

As a general rule, the amount of added vapour pressure-lowering agent should not exceed about 50% and is preferably below about 35%, such as below about 30%. Expressed as intervals, the amount of added vapour pressure-lowering agent is 0-50%, such as 0-35% and specifically 0-30%.

In an advantageous embodiment of the present process, the aerosol is generated by a spinning or rotating disk technique. The basic principles of such rotary atomiser machines have been described in general, see e.g. in Spray Dying Handbook, K. Masters, 5th $^e$d., Longman Scientific & Technical, Longman Group UK Limited; and Atomization and Sprays, A. Lefebvre, Hemisphere Publications, 1989; and Liquid Atomzation, L. Bayvel and Z. Orzechowski, Taylor and Francis, 1993. A specific example is also described in WO 88/07414 (Prometic Biosciences Inc). However, in alternative embodiments, the aerosol is generated by any other conventional means, such as spraying, see e.g. U.S. Pat. No. 6,248,268. The equipment for manufacture of the beads is advantageously controlled by suitable software, as is well known in this field.

In one embodiment, droplets are subsequently collected on a surface, such as a sloped surface, which is preferably coated with a film of water. In the preferred embodiment, the droplets are collected in a bath comprised of a liquid having a reduced surface tension, such as water with an added surfactant. The recovered beads can be stored as suspensions or slurries.

In an especially advantageous embodiment of the present process, the polysaccharide droplets are cooled in an essentially steam-saturated atmosphere. To enable control of the surrounding atmosphere, the above-discussed apparatus can be provided with a housing or enclosure arranged over the spinning disk.

The content of polysaccharide in the solution from which the aerosol is generated should be kept at a level that enables for the droplets to retain their structural integrity as they travel through the air and reaches the surface or liquid. The polysaccharide present in the aerosol droplets will begin to gel as soon as a temperature below its gelling temperature is reached. During the gelling, a physical cross-linking of the polysaccharide will occur, resulting in a porous bead. The solid content of the beads produced according to the invention will be in the range of about 0.5-15%, preferably about 2-12 and most preferably about 4-6%. As the skilled in this field will understand, the viscosity of the solution will decide the upper useful limit, and accordingly, a higher polysaccharide content can at least in part be compensated by lowering the molecular weight of the polysaccharide and/or by intensifying the atomisation conditions. Similarly, as the skilled person will realise, the lower figures of the interval given above may be compensated by a suitable additive.

For some applications, it is desired to further increase the mechanical stability of the manufactured bead. For example, a more rigid bead will better withstand high column pressures when used in chromatography. Accordingly, in one embodiment of the present process, the polysaccharide solution also comprises an added cross-linker. The cross-linker will provide a chemical cross-linking in addition to the physical cross-linking that occurs spontaneously during gelling. There is a large number of conventionally used and well known cross-linkers available, and accordingly the skilled person in this field can easily select a suitable one depending on the polysaccharide used, the intended use of the final product etc. As illustrating examples, epichlorohydrin, divinylsulfone, di- or polyglycidyl ethers, alkyl dihalogenides, polysaccharides polysubstituted with reactive groups (e g allyl agarose) etc.

In specific embodiments, one or more further components are added to the polysaccharide solution before gelling. Such components are e.g. components valuable for performing ion exchange or affinity chromatography using the final bead, one or more polymers, granules, high density particles, magnetic particles, fibres, leachable template particles etc.

In one embodiment of the present process, the polysaccharide is selected from the group that consists of agarose, alginate, carrageenan, furcelleran, gellan, konjac, pectin, curdlan, starch and galactomannans. Such polysaccharides are known to form physically cross-linked networks spontaneously on cooling or on addition of divalent metal ions. In a preferred embodiment, the polysaccharide is agarose, such as a high-viscosity or low-viscosity agarose. In the case of agarose being the polysaccharide, which can be cross-linked according to conventional methods after the droplet formation with epichlorohydrine. In the case of allyl agarose, cross-linking can be performed in a sequence of steps including addition of epichlorohydrine and salt and bromation of the allyl groups, also in accordance with well-known methods.

A second aspect of the present invention is a population of polysaccharide beads produced from an aerosol generated from a polysaccharide solution and cooled in air, wherein regional dehydration in surface layer has been totally or at least almost totally avoided. As shown in the experimental part below, this is evidenced by a Kav-value which is increased as compared to the Kav-value for a corresponding bead prepared with equivalent process parameters but without use of any vapour pressure-lowering agent. (Porosity values and/or pore sizes of polysaccharide beads are often expressed as exclusion limits in terms of how large portion of the material a particular compound can utilise (Kav). See Hagel in "Protein Purification, Principles, High Resolution, and Applications", J-C Janson and L Rydén (Eds), VCH Publishers Inc. New York, 1989, p. 99.)

The polysaccharide beads according to the invention can also be characterised as beads with mass transport properties and mechanical strength comparable to polysaccharide beads produced according to conventional emulsion technologies, while they contain no traces of the solvent used in said emulsification, such as toluene.

In one embodiment, the population of polysaccharide beads according to the invention has been produced according to a process of manufacture as defined above.

In another embodiment, the polysaccharide bead or population of polysaccharide beads according to the invention have further been derivatized with affinity or ion exchanging groups. Derivatisation of agarose beads is easily done by the skilled person in this field in accordance with standard procedures.

DETAILED DESCRIPTION OF THE DRAWINGS

FIG. 1 shows schematically an apparatus suitable for use of the method according to the present invention. More specifically, FIG. 1 shows a gel pump 1 for feeding gel, via gel feed valve 12 and gel gun and valve 15, onto spinning disc(s) 5. The apparatus is provided with a vapour generator 2 for producing vapour that can be fed via upper vapour valve 6, and lower vapour valve 7 into a dome 9. The apparatus has an upper part 3, which is adjustable up and down, and a lower part 4 with a motor 8 for spinning disc(s) 5, a catch 10 for collecting particles spun off disc(s) 5 and a regulator 11 for controlling the fluid level in catch 10 which delivers the particles to a sieve 14 for particle concentration. The apparatus is also provided with a cleaning liquid tank 13 for cleaning of the apparatus.

Experimental Part Below, the present invention will be illustrated by way of examples, which are not to be construed as limiting the scope of the present invention as defined in the appended claims. All references given below and elsewhere in the present specification are hereby included herein by reference.

EXAMPLE 1

Agarose Beads (5%) Prepared According to the Invention

Agarose solution: 82.5 g of agarose, 525 g of propylene glycol and 2.75 g of $KHPO_4$ were dissolved in 1000 g of water at 100° C. The temperature of the solution was allowed to decrease a few degrees and then boiling was performed again. The solution was transferred to an autoclave and left at 1 standard atmosphere for 2×15 minutes, after which water was added to compensate for steaming during the preparation. The temperature was then lowered to 58° C., which was the temperature of manufacture.

Manufacture of beads: The gel prepared as described above was heated to 95° C. for 120 minutes, the temperature was lowered to 70° C. The equipment described in FIG. 1 was controlled from possible remains of last run, plastic folio was put over the centre to protect from water/humidity, and the plastic folio skirt was controlled for cleanness and length, i.a. the spaltum width. The system was then washed through with water and air, and it was checked that all valves were working. The gel and steam delivery systems were then assembled. The discs were assembled and centricity adjusted. The system was tested by a low velocity dry run and checked for wobbling. The gel pump (MELTEX, type PUR103-1, no C18160987, 220 VAC, 4200W) was equilibrated, the hose and the gel delivery system were provided with thermostat.

Water was pumped through the system, with plastic cover over the lower centre max flow. The catch water system drain was started direct to cesspool, the sieves cleaned and then a suitable set of sieves were assembled. The plastic cover over the lower centre was removed.

The disc rotation was started at 55 Hz (RotorDisque), the detergent pump was started, and the control computer program was started. The steam condensate traps were flushed, the individual steam needle valve settings were checked, the gel pump was started, with water, and the system temperature was allowed to equilibrate for 10 min, while the outlet of the catch was allowed to pass the sieves.

The gel pump was then almost emptied of water, but care was taken not to let it go dry. Then the dissolved agarose gel, prepared as described above, was added and the disc rotation was increased to 83 Hz. Steam condensate traps were flushed every 30 minutes.

EXAMPLE 2, COMPARATIVE

Agarose Beads (5%) Prepared Without any Vapour-pressure Lowering Agent

For the preparation of agarose solution, the procedure of example 1 was followed, except that here the addition of propylene glycol was omitted. The beads were manufactured as described in example 1.

EXAMPLE 3

Agarose Beads (6%) Prepared According to the Invention

Preparation of agarose solution: 99 g of agarose and propylethylene to a concentration of 30% were dissolved in 1500 g of water at 100° C. The temperature of the solution was allowed to decrease a few degrees and then boiling was performed again. The solution was transferred to an autoclave and left at 1 standard atmosphere for 2×15 minutes. 3 ml of glacial acetic acid was added at 75° C., and the solution was left with stirring for 45 minutes to hydrolyse, which was interrupted by addition of 26 g of $KHPO_4$ (0.2 mole) dissolved in 50 ml water at 70° C., which was the temperature of manufacture.

The beads were manufactured as described in example 1.

EXAMPLE 4, COMPARATIVE

Agarose Beads (6%) Prepared Without any Vapour Pressure-lowering Agent

For preparation of the agarose solution, the procedure of example 3 was followed, except that here the addition of propylene glycol was omitted. The beads were manufactured as described in example 1.

RESULTS

| | Ex. 1 | Ex. 2 | Ex. 3 | Ex. 4 |
|---|---|---|---|---|
| Prod.parameters: | | | | |
| Experiment: | Glycol | Comp. | Glycol | Comp. |
| Raw material lit.: | 1.5 | 1.5 | 1.5 | 3 |
| Gel concentration %: | 5 | 5 | 6 | 6 |
| Gel pump l/h: | 1.5 | 1.5 | 1.5 | 1.5 |
| Temp. bowl ° C.: | 58 | 57 | 73 | 67 |
| Temp hose ° C.: | 60 | 58 | 72 | 65 |
| Temp. nozzle ° C.: | 60 | 58 | 72 | 65 |
| Temp. gel from nozzle ° C.: | 60 | 58 | 70 | 65 |
| Temp. gun ° C.: | 62 | 60 | 68 | 79 |
| Temp. valve ° C.: | 63 | 61 | 71 | 70 |
| | o  m  i | o  m  i | o  m  i | o  m  i |
| Steam over: | 0.3  0.3  0.3 | 0.3  0.3  0.3 | 0.3  0.2  0.2 | 0.2  0.2  0.2 |
| Steam under: | 0.2  —  0.2 | 0.2  —  0.2 | 1.0  —  0.2 | 0.2  —  0.2 |
| Steam pressure bar: | 0.75 | 0.75 | 0.75 | 0.75 |
| Droplet generator r/m: | 5300 | 5000 | 5000 | 6000 |

-continued

| RESULTS | | | | |
| --- | --- | --- | --- | --- |
| | Ex. 1 | Ex. 2 | Ex. 3 | Ex. 4 |
| Process data, result: | | | | |
| Top, steam collar ° C.: | 110 | 107 | 94 | 90 |
| Middle over disc ° C.: | 75 | 67 | 56 | 68 |
| Bend before nozzle ° C.: | 60 | 58 | 68 | 63 |
| Dome ° C.: | 38 | 40 | 36 | 42 |
| Crate ° C.: | 21 | 22 | 20 | 24 |
| TS %: | 4 | 4.6 | 4.5 | 4.9 |
| Porosity Ve/V0: | | | 1.57 | |
| Kav, Thy: | 0.17 | 0 | 0.33 | 0 |

The invention claimed is:

1. In a process of manufacture of one or more polysaccharide beads, comprising generating an aerosol of droplets of an aqueous polysaccharide solution in air, cooling the droplets of said aerosol in air to initiate gelling thereof and collecting droplets as gelled beads in a liquid or on a surface, the improvement comprising adding a hydrophilic vapour pressure-lowering agent to said polysaccharide solution to reduce skin formation on the bead surface.

2. The process of claim 1, wherein the vapour pressure-lowering agent includes molecules of a molecular weight below about 200 D, and is defined by a vapour pressure below about 310 mbar at 70° C.

3. The process of claim 1, wherein the vapour pressure-lowering agent results in a surface tension above about 50 mN/m at 10 wt % concentration in water at 25° C.

4. The process of claim 1, wherein the vapour pressure-lowering lowering agent is an organic substance.

5. The process of claim 1, wherein the vapour pressure-lowering agent is selected from the group consisting of glycols and glycerols.

6. The process of claim 5, wherein the vapour pressure-lowering agent is propylene glycol.

7. The process of claim 1, wherein the aerosol is generated by a spinning disk technique.

8. The process of claim 1, wherein the aqueous polysaccharide droplets are cooled in an essentially steam-saturated atmosphere.

9. The process of claim 1, wherein the polysaccharide solution includes a chemical cross-linker.

10. The process of claim 1, wherein the polysaccharide is agarose.

* * * * *